(12) United States Patent
Peng et al.

(10) Patent No.: US 8,920,772 B2
(45) Date of Patent: Dec. 30, 2014

(54) SYSTEM AND PROCESS FOR PRODUCING A $H_2$-CONTAINING GAS AND PURIFIED WATER

(71) Applicant: Air Products and Chemicals Inc., Allentown, PA (US)

(72) Inventors: Xiang-Dong Peng, Orefield, PA (US); Xianming Jimmy Li, Orefield, PA (US); Kalman Tari, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/061,280

(22) Filed: Oct. 23, 2013

(65) Prior Publication Data

US 2014/0037510 A1  Feb. 6, 2014

Related U.S. Application Data

(63) Continuation-in-part of application No. 13/858,363, filed on Apr. 8, 2013, now Pat. No. 8,709,287.

(60) Provisional application No. 61/648,662, filed on May 18, 2012.

(51) Int. Cl.

| | | |
|---|---|---|
| *C01B 3/24* | (2006.01) | |
| *B01J 7/00* | (2006.01) | |
| *C02F 1/16* | (2006.01) | |
| *C02F 1/06* | (2006.01) | |
| *C01B 3/38* | (2006.01) | |

(52) U.S. Cl.
CPC ........... *C02F 1/16* (2013.01); *C01B 2203/0283* (2013.01); *C01B 2203/0883* (2013.01); *C01B 2203/0827* (2013.01); *C01B 2203/0495* (2013.01); *C01B 2203/0233* (2013.01); *B01J 7/00* (2013.01); *C01B 2203/0816* (2013.01); *C01B 2203/043* (2013.01); *C02F 1/06* (2013.01); *C01B 3/384* (2013.01)
USPC ............................................ 423/650; 203/10

(58) Field of Classification Search
USPC ........................................................ 423/650
See application file for complete search history.

(56) References Cited

U.S. PATENT DOCUMENTS

| | | |
|---|---|---|
| 3,399,118 A | 8/1968 | Williamson |
| 3,412,558 A | 11/1968 | Starmer |
| 3,441,393 A | 4/1969 | Finneran et al. |
| 3,479,820 A | 11/1969 | Rutenberg |
| 3,597,328 A | 8/1971 | Michels |
| 3,691,020 A | 9/1972 | Hughes |
| 3,875,017 A | 4/1975 | Saari et al. |
| 4,338,199 A | 7/1982 | Modell |
| 5,421,962 A | 6/1995 | Shvarts et al. |
| 5,441,548 A | 8/1995 | Brandl et al. |

(Continued)

FOREIGN PATENT DOCUMENTS

| | | |
|---|---|---|
| CA | 2190299 | 11/1996 |
| DE | 102 16 709 B4 | 4/2003 |

(Continued)

*Primary Examiner* — Melvin C Mayes
*Assistant Examiner* — Kenneth Vaden
(74) *Attorney, Agent, or Firm* — Bryan C. Hoke, Jr.

(57) ABSTRACT

System and process for producing a $H_2$-containing product gas and purified water from an integrated $H_2$-producing reforming and thermal water purification process. Raw water, such as salt water, is heated by indirect heat transfer with reformate from the $H_2$-producing reforming process for purifying raw water in a multiple effect distillation process.

16 Claims, 9 Drawing Sheets

(56) References Cited

U.S. PATENT DOCUMENTS

| | | |
|---|---|---|
| 7,037,485 B1 | 5/2006 | Drnevich et al. |
| 7,377,951 B2 | 5/2008 | Pham et al. |
| 7,427,368 B2 | 9/2008 | Drnevich |
| 7,988,948 B2 | 8/2011 | Guvelioglu |
| 8,387,545 B2 | 3/2013 | Latimer et al. |
| 8,430,947 B2 | 4/2013 | Latimer et al. |
| 8,496,908 B1 | 7/2013 | Genkin et al. |
| 2004/0038089 A1 | 2/2004 | Hoffjann et al. |
| 2007/0246345 A1 | 10/2007 | Leveson et al. |
| 2009/0117024 A1 | 5/2009 | Weedon et al. |
| 2009/0230359 A1 | 9/2009 | Guvelioglu et al. |
| 2011/0147195 A1 | 6/2011 | Shapiro et al. |
| 2011/0162952 A1 | 7/2011 | Conchieri et al. |
| 2012/0055776 A1 | 3/2012 | Feher |

FOREIGN PATENT DOCUMENTS

| | | |
|---|---|---|
| EP | 0142214 | 5/1985 |
| EP | 0200825 A1 | 12/1986 |
| EP | 1921281 | 10/2007 |
| GB | 754745 | 8/1956 |
| GB | 2443802 | 5/2008 |
| GB | 2470874 A | 12/2010 |
| WO | 2004103896 | 12/2004 |
| WO | 2007149879 A2 | 12/2007 |

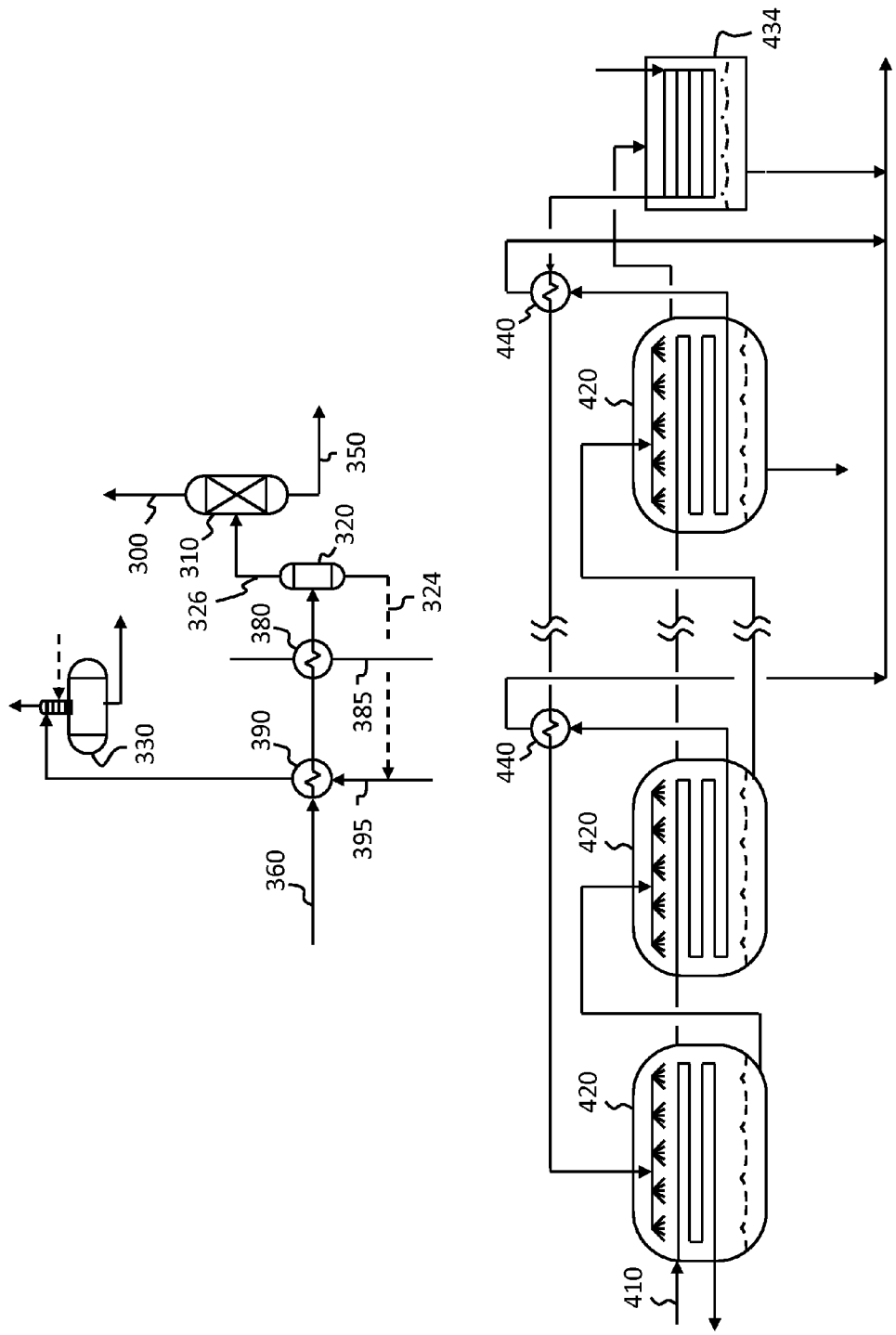
FIG. 9 Comparative Case

SYSTEM AND PROCESS FOR PRODUCING A $H_2$-CONTAINING GAS AND PURIFIED WATER

CROSS-REFERENCE TO RELATED APPLICATIONS

This patent application is a continuation in part of U.S. patent application Ser. No. 13/858,363, filed Apr. 8, 2013 now U.S. Pat. No. 8,709,287, which claims the benefit of Provisional Application Ser. No. 61/648,662, filed on May 18, 2012, the contents of each of which are hereby incorporated by reference as if fully set forth.

BACKGROUND

Thermal water purification processes, such as thermal desalination of salt water using multiple effect distillation (MED), use heat from a low-pressure steam energy source to effect the water purification process. Low pressure steam is generated using common boiler technology (cf. U.S. Pat. Nos. 4,338,199 and 5,441,548).

It is known to use other forms of energy for desalination. For example, U.S. Pat. No. 5,421,962 utilizes solar energy for desalination processes, U.S. Pat. Pub. 2011/0162952 utilizes energy from a gasification process, and U.S. Pat. Pub. 2011/0147195 uses waste heat from a power generation plant for the desalination process.

Hydrogen production processes, such as catalytic steam-hydrocarbon reforming, partial oxidation reforming, catalytic partial oxidation reforming, and autothermal reforming need to reject heat to the environment. Waste heat may need to be removed from an intermediate synthesis gas stream prior to separating the synthesis gas in a gas separator to form hydrogen or other hydrogen-containing product gas. Waste heat is typically rejected to the environment via an air cooler driven by a cooling fan and/or a trim cooler where cooling is provided by cooling water.

Industry desires to utilize waste heat from reforming processes. For example, catalytic steam-hydrocarbon reforming processes release a large amount of waste heat under various circumstances. One circumstance is when the energy cost is low and less capital is spent on heat recovery. Another circumstance is when the process does not produce a large amount of high pressure export steam due to the lack of demand for export steam. Low or zero export steam production reduces the heat sink for the process, resulting in a large amount of waste heat.

Industry desires to produce purified water in water-stressed regions. The water can be used as make-up water in the catalytic steam-hydrocarbon reforming process, making the process self-sufficient with regard to water. Water can also be sold as a product for industrial and municipal use.

Industry desires to reduce or eliminate water treatment cost in a catalytic steam-hydrocarbon reforming plant. Currently, make-up water needs to be treated in a catalytic steam-hydrocarbon reforming plant so that it meets the requirements for the boiler feed water. These treatments include filtration to remove particulates, demineralization to remove minerals, and deaeration to remove soluble gases such as $O_2$ and $CO_2$.

Industry desires to reduce the capital and energy cost of reforming processes. The thermal efficiency of reforming processes depends on the utilization of low level heat. When the energy cost is high, more low level heat is recovered for better thermal efficiency or lower energy cost. However, recovering more heat means using more and/or larger heat exchangers, resulting in higher capital cost. In contrast, when the energy cost is low, the capital cost for heat exchangers is minimized with the sacrifice of thermal efficiency or energy cost.

There exists a need in the art for systems and processes for producing $H_2$-containing product gas and purified water that are cost-effective and provide greater utilization of waste heat from catalytic steam-hydrocarbon reforming processes.

BRIEF SUMMARY

The present invention relates to a process for producing a $H_2$-containing product and for producing purified water.

Embodiments of the present invention satisfy the needs in the art by providing systems and processes for producing a $H_2$-containing product gas and purified water from an integrated reforming and thermal water purification process. Embodiments of the present invention can reduce or eliminate costs associated with dissipating excess waste heat and can also provide flexibility to balance heat load and other operating conditions across the thermal water purification process.

There are several specific aspects of the systems and processes outlined below. The reference numbers and expressions set in parentheses are referring to an example embodiment explained further below with reference to the figures and are provided for the convenience of the reader. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A process for producing a $H_2$-containing product gas (200) and for producing purified water (42) from a raw water stream (53) containing contaminants, the process comprising:

(a) withdrawing a reformate (60) from a reformer (100);

(b) heating at least a portion (63) of the raw water stream (53) by indirect heat transfer with the reformate (60) thereby cooling the reformate (60), and thereby evaporating a portion of the at least a portion (63) of the raw water stream (53) in a first evaporator (51) of a plurality of evaporators of a thermal water purification system (16) to form a first steam stream (41) and a first contaminant-enriched raw water stream (64), withdrawing the first steam stream (41) from the first evaporator (51), and withdrawing the first contaminant-enriched raw water stream (64) from the first evaporator (51), the first contaminant-enriched raw water stream (64) having a higher concentration of the contaminants than the at least a portion (63) of the raw water stream (53) introduced into the first evaporator (51);

(c) heating the raw water stream (53) by indirect heat transfer with the reformate (60) after the reformate has already been cooled in step (b), thereby further cooling the reformate to a temperature ranging from 20° C. to 60° C., wherein the at least a portion (63) of the raw water stream (53) is heated in step (c) prior to being heated in step (b);

(d) introducing the first steam stream (41) into a second evaporator (54) of the plurality of evaporators of the thermal water purification system (16), heating one of either the first contaminant-enriched raw water stream (64) withdrawn from the first evaporator (51) or a second portion (65) of the raw water stream (53) by indirect heat transfer with the first steam stream (41) to form a second steam stream (43) by evaporating a portion of the one of either the first contaminant-enriched raw water stream (64) or the second portion (65) of the raw water stream (53), thereby cooling the first steam stream (41) and forming a first condensate stream (71) from the first steam stream (41), withdrawing the second steam stream (43) from the second evaporator (54), withdrawing the first condensate stream (71) from the second evaporator (54) wherein the purified water (42) comprises the first condensate stream (71), and withdrawing a second contaminant-enriched raw water stream (66) from the second evaporator (54), the second contaminant-enriched raw water stream (66) having a higher concentration of the contaminants than the one of either the first contaminant-enriched raw water stream (64) withdrawn from the first evaporator (51) or the second portion (65) of the raw water stream (53); and (e) forming the $H_2$-containing product gas from the reformate (60) after cooling the reformate in step (c).

Aspect 2. The process of aspect 1 wherein step (d) comprises introducing the first steam stream (41) into a second evaporator (54) of the plurality of evaporators of the thermal water purification system (16), heating the first contaminant-enriched raw water stream (64) withdrawn from the first evapator (51) by indirect heat transfer with the first steam stream (41) to form a second steam stream (43) by evaporating a portion of the first contaminant-enriched raw water stream (64), thereby cooling the first steam stream (41) and forming a first condensate stream (71) from the first steam stream (41), withdrawing the second steam stream (43) from the second evaporator (54), withdrawing the first condensate stream (71) from the second evaporator (54) wherein the purified water (42) comprises the first condensate stream (71), and withdrawing a second contaminant-enriched raw water stream (66) from the second evaporator (54), the second contaminant-enriched raw water stream (66) having a higher concentration of the contaminants than the first contaminant-enriched raw water stream (64) withdrawn from the first evaporator (51).

Aspect 3. The process of aspect 1 wherein step (d) comprises introducing the first steam stream (41) into a second evaporator (54) of the plurality of evaporators of the thermal water purification system (16), heating a second portion (65) of the raw water stream (53) by indirect heat transfer with the first steam stream (41) to form a second steam stream (43) by evaporating a portion of the second portion (65) of the raw water stream (53), thereby cooling the first steam stream (41) and forming a first condensate stream (71) from the first steam stream (41), withdrawing the second steam stream (43) from the second evaporator (54), withdrawing the first condensate stream (71) from the second evaporator (54) wherein the purified water (42) comprises the first condensate stream (71), and withdrawing a second contaminant-enriched raw water stream (66) from the second evaporator (54), the second contaminant-enriched raw water stream (66) having a higher concentration of the contaminants than the second portion (65) of the raw water stream (53), wherein the second portion (65) of the raw water stream (53) is heated in step (c) prior to being heated in step (d).

Aspect 4. The process of any one of aspects 1 to 3 wherein heating at least a portion (63) of a raw water stream (53) by indirect heat transfer with the reformate (60) in step (b) comprises:
heating a working fluid (185) by indirect heat transfer with the reformate (60) to form a heated working fluid (196), and heating the at least a portion (63) of the raw water stream (53) by indirect heat transfer with the heated working fluid (196) in the evaporator (51).

Aspect 5. The process of aspect 4 wherein the working fluid is water and the heated working fluid is steam.

Aspect 6. The process of any one of aspects 1 to 3 wherein heating the at least a portion (63) of the raw water stream (53) by indirect heat transfer with the reformate (60) in step (b) comprises:
heating working fluid water (185) by indirect heat transfer with the reformate (60) wherein the working fluid water is evaporated to form working fluid steam (196) having a pressure ranging from 15.2 kPa to 304 kPa (absolute) when heated by the reformate (60), and
heating the at least a portion (63) of the raw water stream (53) by indirect heat transfer with the working fluid steam (196) in the evaporator (51), wherein the working fluid steam is condensed when heating the at least a portion (63) of the raw water stream (53).

Aspect 7. The process of any one of aspects 1 to 3 wherein step (b) does not include heating of an intermediate working fluid.

Aspect 8. The process of any one of aspects 1 to 7 further comprising:
(f) heating a first water stream (95) by indirect heat transfer with the reformate (60) thereby cooling the reformate (60), wherein the first water stream (95) comprises at least a portion of the purified water (42);
wherein the reformate (60) is cooled in step (f) prior to being cooled in step (b), or the reformate (60) is cooled in step (b) prior to being cooled in step (f).

Aspect 9. The process of aspect 8 wherein the reformate (60) is cooled in step (f) prior to being cooled in step (b).

Aspect 10. The process of aspect 8 wherein the reformate (60) is cooled in step (b) prior to being cooled in step (f) and is cooled in step (f) prior to being cooled in step (c).

Aspect 11. The process of any one of aspects 8 to 10 further comprising passing the first water stream (95) to a deaerator (130) after heating the first water stream in step (f).

Aspect 12. The process of any one of aspects 8 to 10 further comprising:
passing the first water stream (95) to a steam drum (160) after heating the first water stream in step (f) without passing the first water stream (95) to a deaerator.

Aspect 13. The process of any one of aspects 8 to 10 further comprising:
passing the first water stream (95) to at least one of an ion exchange unit and electrodeionization unit before heating the first water stream (95) in step (f); and
passing the first water stream (95) to a steam drum (160) after heating the first water stream in step (f) without passing the first water stream (95) to a deaerator.

Aspect 14. The process of any one of aspects 8 to 13 wherein the first water stream comprises the purified water (42).

Aspect 15. The process of any one of aspects 8 to 13 wherein the first water stream consists of the purified water (42).

Aspect 16. The process of any one of aspects 8 to 13 wherein the first water stream consists of the purified water stream without treating by filtration, or demineralization.

Aspect 17. The process of any one of aspects 1 to 16 wherein the step of forming the $H_2$-containing product gas (200) from the reformate comprises:
passing the reformate (60) after cooling in step (c) to a knock-out drum (220), separating the reformate (60) into a condensate stream (224) and a water-depleted reformate (226); and
introducing at least a portion of the water-depleted reformate (226) into a separator (210) and separating the at least a portion of the water-depleted reformate (226) in the separator to produce the H₂-containing product gas (200) and a by-product gas (250).

Aspect 18. The process of aspect 17 wherein the separator is a pressure swing adsorber.

Aspect 19. The process of any one of aspects 1 to 18, wherein the raw water comprises at least one of salt water, river water, stream water, lake water, municipal recycled water, industrial recycled water, groundwater, and process condensate from a steam methane reforming process.

Aspect 20. A system for producing a H₂-containing gas (200) and for producing purified water (42) from a raw water stream (53) containing contaminants, the system comprising:
- a reformer (100) having an outlet for withdrawing a reformate (60);
- a thermal water purification system (16) comprising a plurality of evaporators, the plurality of evaporators comprising:
  - a first evaporator (51) configured to provide indirect heat exchange between at least a portion (63) of the raw water stream (53) and one of either the reformate (60) or steam (196) where the steam (196) is formed from water by indirect heat exchange with the reformate (60) in a first heat exchanger (190), the first evaporator operatively disposed to receive the one of either the reformate (60) from the reformer or steam (196) from the first heat exchanger (190), the first evaporator (51) operatively disposed to receive the at least a portion (63) of the raw water stream (53), the first evaporator having a first outlet for withdrawing a steam stream (41) formed from the at least a portion (63) of the raw water stream (53) and a second outlet for withdrawing a contaminant-enriched raw water stream (64) formed from the at least a portion (63) of the raw water stream (53), and
  - a second evaporator (54) configured to provide indirect heat exchange between the steam stream (41) and one of either the contaminant-enriched raw water stream (64) or a second portion (65) of the raw water stream (53), the second evaporator (54) operatively disposed to receive the one of either the contaminant-enriched raw water stream (64) or the second portion (65) of the raw water stream (53), the second evaporator (54) operatively disposed to receive the steam stream (41) from the first evaporator, the second evaporator (54) having a first outlet for withdrawing a steam stream (43) formed from the one of either the contaminant-enriched raw water or the second portion of the raw water stream, a second outlet for withdrawing a condensate stream (71) formed from the steam stream (41), and a third outlet for withdrawing a second contaminant-enriched raw water stream (66) formed from the one of either the contaminant enriched raw water stream (64) or the second portion (65) of the raw water stream (53), wherein the purified water stream comprises the condensate stream (71);
- a second heat exchanger (180) configured to provide indirect heat exchange between the reformate (60) and the raw water stream (53), the second heat exchanger (180) operatively disposed to receive the reformate (60) from one of the first evaporator (51) and the first heat exchanger (190), wherein the first evaporator (51) is operatively disposed to receive the at least a portion (63) of the raw water stream (53) from the second heat exchanger (180);
- a knock-out drum (220) operatively disposed to receive the reformate (60) from the second heat exchanger (180), the knock-out drum having a first outlet for withdrawing a water-depleted reformate (226) and a second outlet for withdrawing water (224); and
- a separator operatively disposed to receive the water-depleted reformate (226) from the knock-out drum (220), the separator for producing the H₂-containing gas from the water-depleted reformate (226).

Aspect 21. The system of aspect 20 wherein the first evaporator (51) is configured to provide indirect heat exchange between the at least a portion (63) of the raw water stream (53) and the reformate (60), wherein the first evaporator (51) is operatively disposed to receive the reformate (60) from the reformer, and wherein the second heat exchanger (180) is operatively disposed to receive the reformate (60) from the first evaporator (51).

Aspect 22. The system of aspect 20 wherein the first evaporator (51) is configured to provide indirect heat exchange between the at least a portion of the raw water stream (53) and steam where the steam is formed from water by indirect heat exchange with the reformate in the first heat exchanger (190), the first evaporator (51) is operatively disposed to receive the steam (196) from the first heat exchanger (190), and wherein the second heat exchanger is operatively disposed to receive the reformate (60) from the first heat exchanger (190).

Aspect 23. The system of any one of aspects 20 to 22 wherein the separator is a pressure swing adsorber.

Aspect 24. The system of any one of aspects 20 to 23 wherein the reformer is a catalytic steam-hydrocarbon reformer.

BRIEF DESCRIPTION OF SEVERAL VIEWS OF THE DRAWINGS

FIG. 9 is a process flow diagram for an arrangement wherein a reforming process and a separate multiple effect distillation process are not integrated.

DETAILED DESCRIPTION

Figure 1:
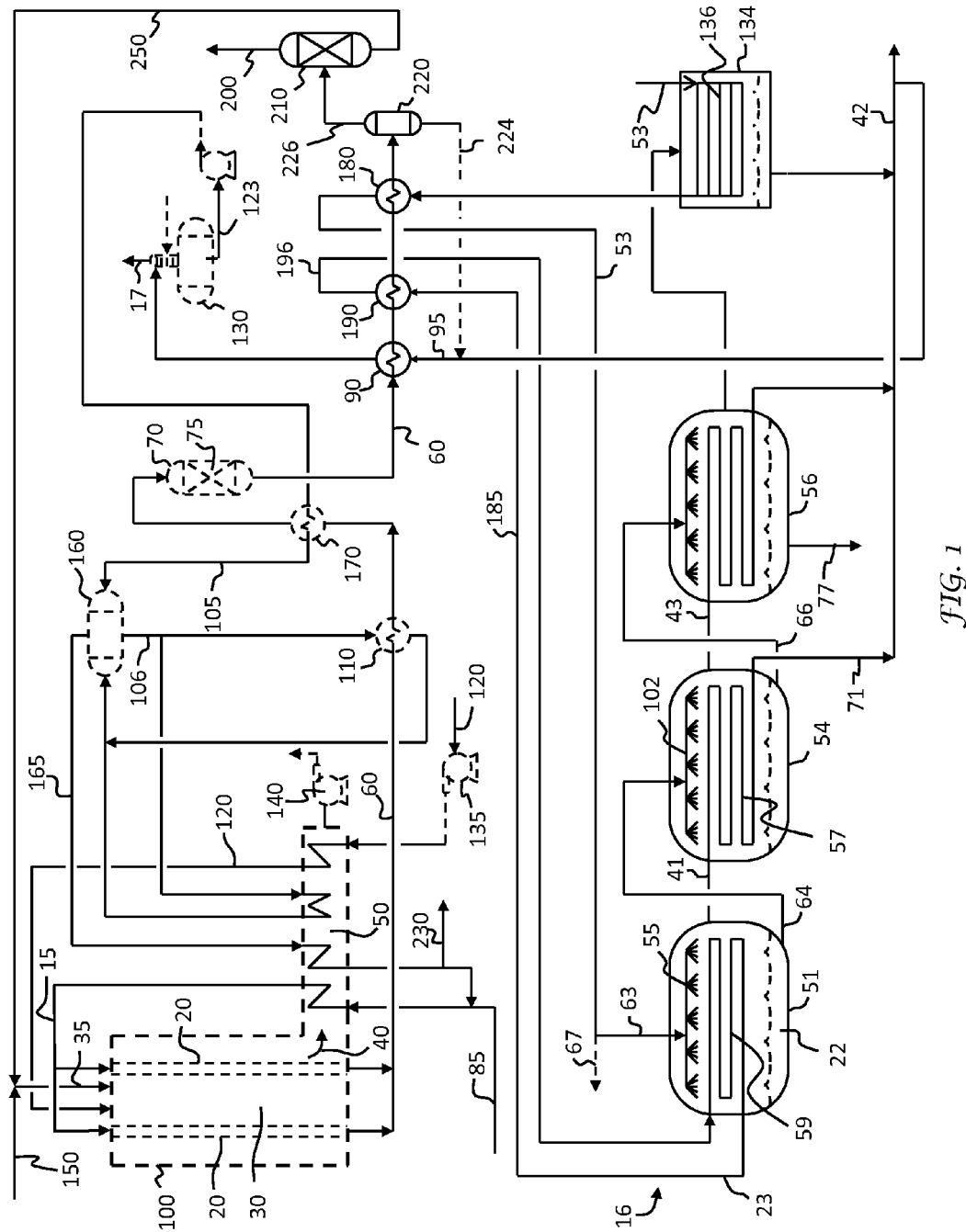
FIG. 1 is a process flow diagram of a reforming process integrated with a multiple effect distillation process utilizing a working fluid to exchange heat from the reformate to an evaporator of the multiple effect distillation process where raw water is introduced into the evaporators in a serial manner.
Figure 2:
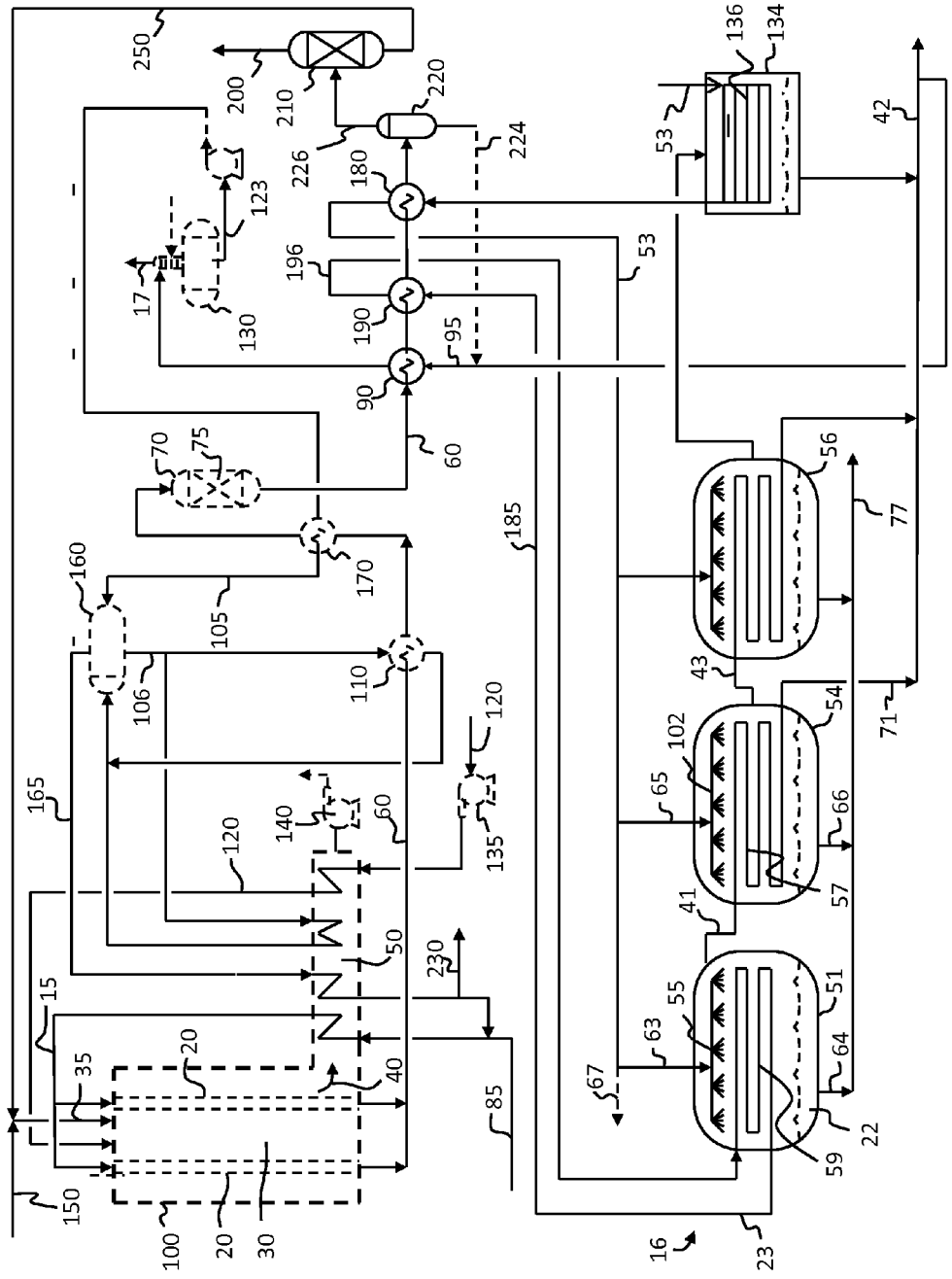
FIG. 2 is process flow diagram of a reforming process integrated with a multiple effect distillation process utilizing a working fluid to exchange heat from the reformate to an evaporator of the multiple effect distillation process where raw water is introduced into the evaporators in a parallel manner.
Figure 3:
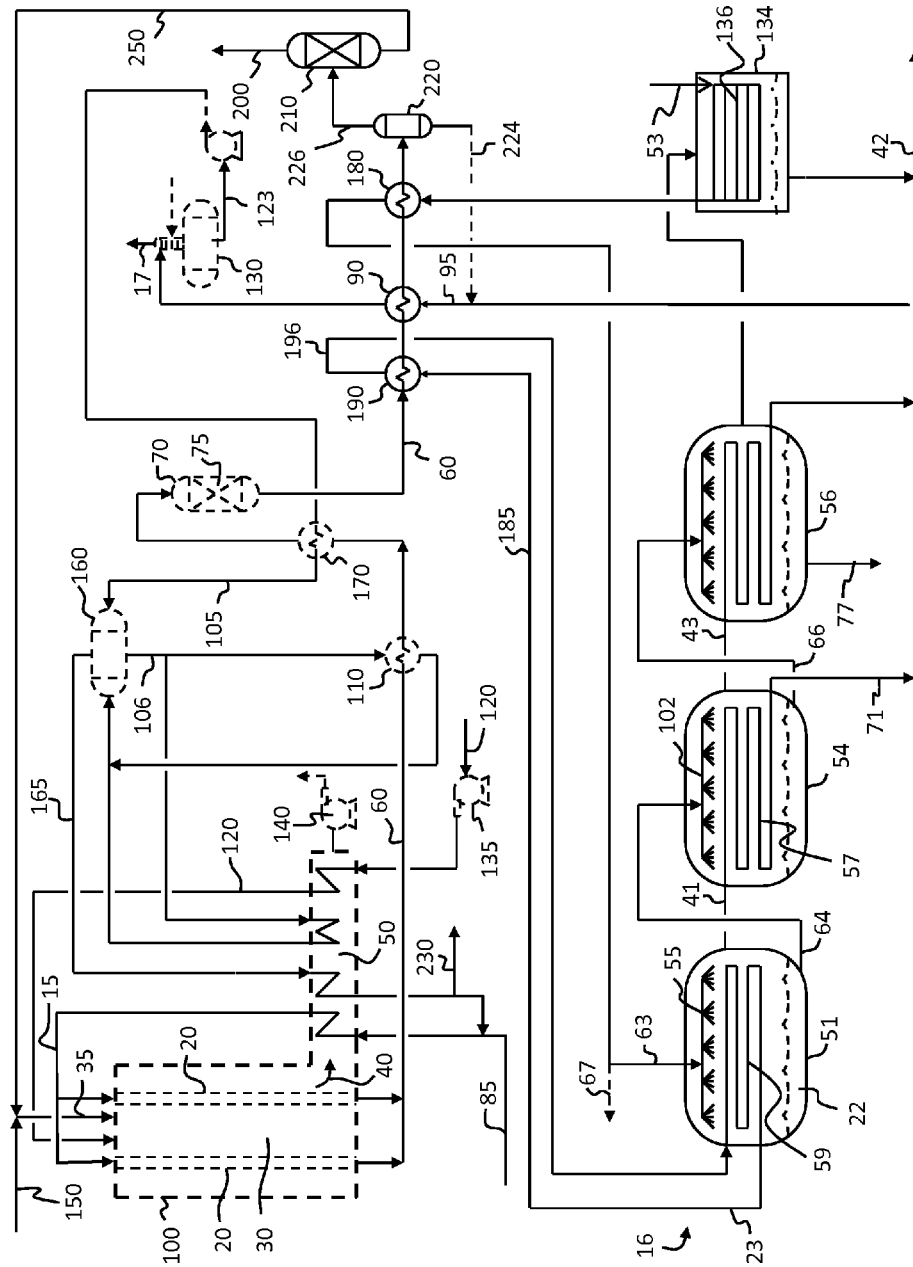
FIG. 3 is another process flow diagram of a reforming process integrated with a multiple effect distillation process utilizing a working fluid to exchange heat from the reformate to an evaporator of the multiple effect distillation process where raw water is introduced into the evaporators in a serial manner.
Figure 4:
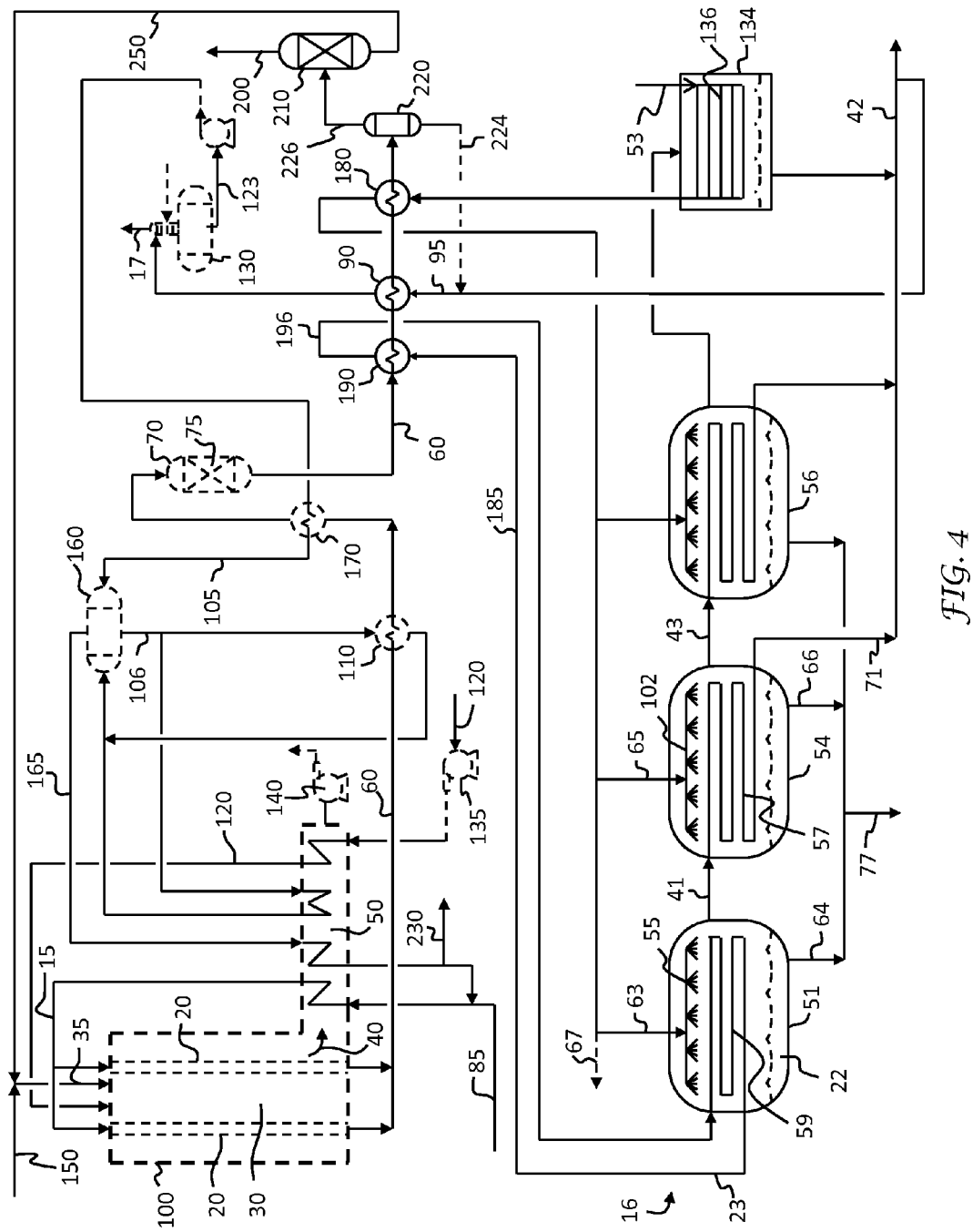
FIG. 4 is another process flow diagram of a reforming process integrated with a multiple effect distillation process utilizing a working fluid to exchange heat from the reformate to an evaporator of the multiple effect distillation process where raw water is introduced into the evaporators in a parallel manner.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list.

The phrase "at least a portion" means "a portion or all." The at least a portion of a stream may have the same composition as the stream from which it is derived. The at least a portion may have a different composition to that of the stream from which it is derived. The at least a portion of a stream may include specific components of the stream from which it is derived.

As used herein a "divided portion" of a stream is a portion having the same chemical composition as the stream from which it was taken.

As used herein, "first," "second," "third," etc. are used to distinguish from among a plurality of features and/or steps and does not indicate the relative position in time or space.

As used herein, the term "catalyst" refers to a support, catalytic material, and any other additives which may be present on the support.

The term "depleted" means having a lesser mole % concentration of the indicated component than the original stream from which it was formed. "Depleted" does not mean that the stream is completely lacking the indicated component.

As used herein, "heat" and "heating" may include both sensible and latent heat and heating.

As used herein, "raw water" is any impure water, for example, one or more of salt water (ocean water, seawater, brackish water), surface water such as a stream, river, or lake, groundwater, municipal/industrial reuse or recycled water, or waste water from an industrial process, such as rejected water from a steam methane reforming process such as the process condensate. The process condensate is the water condensed from the reformate stream of the SMR process. Raw water is generally less pure than conventional industrial feed water, such as potable water.

As used herein, "purified water" means any distilled water (i.e. distillate or condensed water) from a thermal water purification process.

A thermal water purification process as used herein is any process that uses a heat source to evaporate raw water and condenses the evaporated water vapor into a condensate or distillate (i.e. the purified water). The thermal water purification process may be, for example, a known commercial thermal desalination process such as a multiple effect distillation (MED) process.

As used herein, "reformate" or "a reformate stream" is any stream comprising hydrogen and carbon monoxide formed from the reforming reaction of a hydrocarbon and steam.

As used herein, "indirect heat transfer" is heat transfer from one stream to another stream where the streams are not mixed together. Indirect heat transfer includes, for example, transfer of heat from a first fluid to a second fluid in a heat exchanger where the fluids are separated by plates or tubes. Indirect heat transfer includes transfer of heat from a first fluid to a second fluid where an intermediate working fluid is used to carry the heat from the first fluid to the second fluid. The first fluid may evaporate an intermediate working fluid, (e.g. evaporate water to form steam), in an evaporator, the working fluid passed to another heat exchanger or condenser, where the working fluid transfers heat to the second fluid. Indirect heat transfer from the first fluid to a second fluid using a working fluid may be accommodated using a heat pipe, thermosyphon or the like.

As used herein, "direct heat transfer" is heat transfer from one stream to another stream where the streams are intimately mixed together. Direct heat transfer includes, for example, humidification where water is sprayed directly into a hot air stream and the heat from the air evaporates the water.

As used herein, "fluid flow communication" refers to the nature of connectivity between two or more components that enables liquids and/or gases to be transported between the components in a controlled fashion. For example, a heat transfer coil in one evaporator can be in fluid flow communication with a heat transfer coil in another evaporator such that gas and/or liquid can be transported therebetween without leakage. Coupling two or more components such that they are in fluid flow communication with each other can involve any suitable method known in the art, such as with the use of flanged conduits, gaskets, and bolts. In the figures, conduits are depicted as lines with arrows connecting one or more other components of the system. Each such conduit is fluidly connected to an outlet of a component (i.e., the component from which the line originates) and an inlet of another component (i.e., the component at which the arrow terminates) such that the components are in fluid flow communication and a gas and/or liquid can be carried therebetween.

In the claims, letters or roman numerals may be used to identify claimed process steps (e.g., (a), (b), (c), (d), etc. and (i), (ii), (iii), iv), etc.). These letters or roman numerals are used to aid in referring to the process steps and are not intended to indicate the order in which claimed steps are performed, unless and only to the extent that such order is specifically recited in the claims.

The present invention relates to a system and process for producing a $H_2$-containing product and for producing purified water. The $H_2$-containing product may be a purified $H_2$ product gas or a synthesis gas having a desired $H_2$:CO molar ratio. The purified water may be desalinated water, i.e. purified water from salt water. For the purposes of the present disclosure, "desalinated water" means water from which 99-100 wt % of salt originally present has been removed.

The present invention relates to heat integration between a reforming process for producing a $H_2$-containing product and a thermal water purification process for producing purified water. The reforming process may be a catalytic steam-hydrocarbon reforming process, a partial oxidation reforming process, catalytic partial oxidation process, autothermal reforming process, or other reforming process known in the art for producing a $H_2$-containing product.

In a preferred embodiment, the reforming process is a catalytic steam-hydrocarbon reforming process. The catalytic steam-hydrocarbon reforming process uses a large amount of water for reaction (e.g. $CH_4+2H_2O \rightarrow 4H_2+CO_2$) and production of high pressure steam as a co-product. The process also produces a large amount of low level heat. Thermal water purification produces purified water from raw water, and its energy source is low level heat. These two processes complement each other in that catalytic steam-hydrocarbon reforming consumes water and generates low level heat, whereas thermal water purification uses low level heat and generates water. The present invention exploits these properties and achieves reduction in the total capital and energy cost of the integrated process.

Catalytic steam-hydrocarbon reforming has heretofore not been integrated with thermal water purification, even though catalytic steam-hydrocarbon reforming produces a large amount of low level heat. No specific integration schemes have been disclosed up to now.

Referring now to the drawings, wherein like reference numbers refer to like elements throughout the several views, FIGS. 1 through 8 show process flow diagrams for various embodiments of a reforming process for producing a $H_2$-containing product 200 integrated with a Multiple Effect Distillation (MED) thermal water purification process for producing purified water 42 from raw water stream 53 containing contaminants.

The system comprises a reformer 100 having an outlet for withdrawing a reformate 60.

In the figures, the reforming process is shown as being carried out by a catalytic steam-hydrocarbon reformer 100. While described and shown in the figures as a catalytic steam-hydrocarbon reformer, other reformer types for producing $H_2$-containing gas may be used.

The process may preferably utilize catalytic steam-hydrocarbon reforming. Catalytic steam-hydrocarbon reforming, also called steam methane reforming (SMR), catalytic steam reforming, or steam reforming, is defined as any process used to convert reformer feedstock into synthesis gas by reaction with steam over a catalyst. Synthesis gas, commonly called syngas, is any mixture comprising hydrogen and carbon monoxide. The reforming reaction is an endothermic reaction and may be described generally as $C_nH_m+n\,H_2O \rightarrow n\,CO+(m/2+n)H_2$. Hydrogen is generated when synthesis gas is generated.

In catalytic steam-hydrocarbon reforming, a reformer feed gas mixture 15 is introduced into a plurality of catalyst-containing reformer tubes 20 in the reformer furnace 100. The reformer feed gas mixture 15 is reacted in a reforming reaction under reaction conditions effective to form a reformate 60 comprising $H_2$, CO, $CH_4$, and $H_2O$, and the reformate 60 is withdrawn from the plurality of catalyst-containing reformer tubes 20.

The reformer feed gas mixture 15 comprises a hydrocarbon feedstock and steam, or a mixture of preformed hydrocarbon feedstock and steam. Feedstock may be natural gas, methane, naphtha, propane, refinery fuel gas, refinery off-gas, or other suitable reformer feedstock known in the art.

In catalytic steam-hydrocarbon reforming, the reforming reaction takes place in the plurality of catalyst-containing reformer tubes in reformer furnace 100. A reformer furnace, also called a catalytic steam reformer, steam methane reformer, and steam-hydrocarbon reformer, is defined herein as any fired furnace used to convert feedstock containing elemental hydrogen and carbon to synthesis gas by a reaction with steam over a catalyst with heat provided by combustion of a fuel.

Reformer furnaces with a plurality of catalyst-containing reformer tubes, i.e. tubular reformers, are well known in the art. Any suitable number of catalyst-containing reformer tubes may be used. Suitable materials and methods of construction are known. Catalyst in the catalyst-containing reformer tubes may be any suitable catalyst known in the art, for example, a supported catalyst comprising nickel.

The reaction conditions effective to form the reformate 60 may comprise a first temperature ranging from 500° C. to 1000° C. and a first pressure ranging from 203 kPa to 5,066 kPa (absolute).

Energy to heat the catalyst-containing reformer tubes and thereby provide the reaction conditions effective to form the reformate may be provided by combusting a fuel 35 with an oxidant gas 120 in the reformer furnace 100 external to the plurality of catalyst-containing reformer tubes 20. The fuel is combusted under conditions effective to combust the fuel to form a combustion product gas 40 and generate heat to supply energy for reacting the reformer feed gas mixture 15 inside the plurality of catalyst-containing reformer tubes 20. A combustion product gas 40 is withdrawn from the reformer furnace 100. Conditions effective to combust the fuel may comprise a temperature ranging from 600° C. to 1500° C. and a pressure ranging from 99 kPa to 101.3 kPa (absolute).

The fuel 35 may comprise by-product gas 250 from pressure swing adsorber 210. The fuel 35 may comprise supplemental fuel 150. The supplemental fuel is often called trim fuel. The supplemental fuel may be natural gas or other suitable fuel. The oxidant gas 120 may, for example, be air.

The fuel 35 and oxidant gas 120 are combusted external to the plurality of catalyst-containing reformer tubes 20 in the combustion section 30, (also called radiant section) of the reformer furnace 100. The combustion product gas 40 is passed from the combustion section 30 to the convection section 50 of the reformer furnace 100. In the convection section 50 of the reformer furnace 100, various streams are heated by the combustion product gas 40. The combustion product gas 40 is withdrawn from the convection section through exhaust fan 140.

As shown in the figures, combustion air 120 may be compressed in compressor 135 and may be heated in a heat exchanger in the convection section 50 before being introduced for combustion. Boiler feed water may be withdrawn from steam drum 160, heated in a heat exchanger in the convection section 50 of the reformer furnace 100, and passed back to the steam drum 160 to make steam. Pressure swing adsorber tail gas may be heated in a heat exchanger (not shown) in the convection section 50 before being introduced for combustion.

Steam 165 from the steam drum 160 may be superheated in a heat exchanger in the convection section 50 of the reformer furnace 100. At least a portion of the superheated steam (commonly called process steam) is blended with a hydrocarbon feedstock 85 to form the reformer feed gas mixture 15. A portion of the superheated steam may be exported as export steam 230.

The reformer feed gas mixture 15 may be further heated in a heat exchanger in the convection section 50 of the reformer furnace 100 before being passed to the plurality of catalyst-containing reformer tubes 20.

The superheated steam may be blended with a hydrocarbon feed, heated and passed to a prereformer to reform a portion of the blend. The prereformer may be an adiabatic prereformer. The mixture from the prereformer may be heated in the convection section 50 of the reformer furnace 100 before being passed to the plurality of catalyst-containing reformer tubes as the reformer feed gas mixture 15.

As shown in the figures, saturated boiler feed water 106 may be withdrawn from steam drum 160 and passed to heat exchanger 110 where the saturated boiler feed water 106 may be heated by indirect heat exchange with the reformate 60 in heat exchanger 110. The heated boiler feed water may be returned to steam drum 160 where steam and water are separated. Steam 165, having a pressure, for example, ranging from 1.5 to 12.5 MPa (absolute), may be withdrawn from the steam drum and saturated boiler feed water passed to various heat exchangers to be heated.

As shown in the figures, boiler feed water 105 may be heated in heat exchanger 170 by indirect heat transfer with reformate 60 from heat exchanger 110. As shown in the figures, boiler feed water 105 may be heated in heat exchanger 170, passed to steam drum 160, and then passed to heat exchanger 110 to be heated further in heat exchanger 110 by reformate 60.

Boiler feed water is water that meets certain purity requirements for use in boilers and stream drums.

As shown in the figures, the reformate 60 may be passed from the second heat exchanger 170 to shift reactor 70. Reformate 60 from the second heat exchanger 170 may be reacted in the presence of a shift catalyst 75 under reaction conditions effective to form additional hydrogen in the reformate 60. Additional hydrogen gas may be obtained by the catalytic reaction of carbon monoxide and steam. This reaction is exothermic and is commonly referred to as the water-gas shift reaction or shift reaction: $CO+H_2O \rightarrow CO_2+H_2$. The shift reaction is effected by passing carbon monoxide and water through a bed of a suitable catalyst. The reaction conditions effective to form additional hydrogen in the reformate 60 may comprise a second temperature ranging from 190° C. to 500° C. and a second pressure ranging from 203 kPa to 5,066 kPa (absolute).

Any suitable shift catalyst may be used. The shift reactor may be a so-called high temperature shift (HTS), low temperature shift (LTS), medium temperature shift (MTS), or combination. Since the article "a" means "one or more," one or more shift reactors may be used in the process.

For high temperature shift, an inlet temperature in the range 310° C. to 370° C., and an outlet temperature in the range 400° C. to 500° C. are typical. Usually an iron oxide/chromia catalyst is used for high temperature shift.

For low temperature shift, an inlet temperature in the range 190° C. to 230° C., and an outlet temperature in the range 220° C. to 250° C. are typical. Usually a catalyst comprising metallic copper, zinc oxide, and one or more other difficultly reducible oxides such as alumina or chromia is used for low temperature shift For medium temperature shift, an inlet temperature in the range 190° C. to 230° C. and an outlet temperature of up to 350° C. are typical. A suitably formulated supported copper catalyst can be used for medium temperature shift. Medium temperature shift may be preferred for the present process.

A combination may include a sequence of high temperature shift, cooling by indirect heat exchange, and low temperature shift. If desired, either shift stage can be subdivided with interbed cooling.

The system comprises a thermal water purification system 16 (e.g. a multiple effect distillation system) comprising a plurality of evaporators. The plurality of evaporators comprise at least a first evaporator 51 and a second evaporator 54. The plurality of evaporators may comprise additional evaporators 56.

The system may use a working fluid (e.g. water/steam) to transfer heat from the reformate 60 to at least a portion 63 of the raw water 53 in evaporator 51 as shown in FIGS. 1-4. Alternatively, the system may transfer heat from the reformate to at least a portion 63 of the raw water 53 in evaporator 51 without the use of an intermediate working fluid as shown in FIGS. 5-8.

In FIGS. 1-4, the system uses a working fluid (e.g. water/steam) to transfer heat from the reformate 60 to the raw water in evaporator 51. The first evaporator 51 is configured to provide indirect heat exchange between at least a portion 63 of raw water stream 53 and steam 196 where steam 196 is formed from liquid water by indirect heat exchange with reformate 60 in heat exchanger 190. The first evaporator 51 is operatively disposed to receive steam 196 from the first heat exchanger 190 and operatively disposed to receive the at least a portion 63 of raw water stream 53. The first evaporator has a first outlet for withdrawing a steam stream 41 which is formed from the at least a portion of the raw water stream 53 and a second outlet for withdrawing a contaminant-enriched raw water stream 64.

Steam 196 is passed to heat transfer coil 59 of evaporator 51. Steam is cooled and condensed in heat transfer coil 59 as a result of heat transfer with raw water brought into contact with the exterior of coil 59, typically by spraying the raw water through spray bar 55. The condensate 185 is withdrawn from coil 59 and passed back to heat exchanger 190 to form steam 196.

In FIGS. 5-8, the system transfers heat from the reformate 60 to the raw water in evaporator 51 without heating an intermediate working fluid. The first evaporator 51 is configured to provide indirect heat exchanger between at least a portion 63 of the raw water stream 53 and the reformate 60. The first evaporator is operatively disposed to receive the reformate 60 from the reformer 100 and to receive the at least a portion 63 of the raw water stream 53. As in FIGS. 1-4, the first evaporator has a first outlet for withdrawing a steam stream 41 which is formed from the at least a portion of the raw water stream 53 and a second outlet for withdrawing a contaminant-enriched raw water stream 64.

The raw water which is sprayed through spray bar 55 onto the exterior of the coil 59 of evaporator 51 undergoes evaporation to form water vapor due to heat transfer between the coil 59 heated by the reformate or steam passing internally therethrough. The water vapor so-produced passes from evaporator 51 into heat transfer coil 57 disposed internally of second evaporator 54. Raw water is sprayed onto the exterior of heat transfer coil 57 through spray bar 102, and the water vapor inside the coil 57 condenses within the heat transfer coil 57, exits second evaporator 54 and is collected as water condensate 71. Water vapor produced by heat transfer in evaporator 54 is passed into evaporator 56 where the process is repeated, and so on for as many evaporators as are present in the system. Water vapor exiting the last evaporator in the series is condensed in condenser 134 by contact with heat transfer coil 136 through which cold raw water feed is passed. Purified water condensate so-produced is combined with that produced in the other evaporators and collected. A contaminant-enriched raw water stream 77 which is formed after passing through each of the evaporators as shown in FIGS. 1, 3, 5 and 7 or a contaminant-enriched raw water stream 77 which is formed from the contaminant-enriched raw water streams from each of the evaporators as shown in FIGS. 2, 4, 6, and 8 is collected and discharged.

The second evaporator 54 is configured to provide indirect heat exchange between the steam stream 41 from the first evaporator 51 and one of either the contaminant-enriched raw water stream 64 withdrawn from the first evaporator 51, as shown in FIGS. 1, 3, 5, and 7, or a second portion 65 of the raw water stream 53, as shown in FIGS. 2, 4, 6, and 8. The second evaporator 54 is operatively disposed to receive the contaminant-enriched raw water stream 64 as shown in FIGS. 1, 3, 5, and 7, or the second portion 65 of the raw water stream 53 as shown in FIGS. 2, 4, 6, and 8. The second evaporator 54 is operatively disposed to receive the steam stream 41 from the first evaporator. The second evaporator 54 has a first outlet for withdrawing a steam stream 43 formed from the contaminant-enriched raw water 64 as shown in FIGS. 1, 3, 5, and 7, or the second portion 65 of the raw water stream as shown in FIGS. 2, 4, 6, and 8. The second evaporator has a second outlet for withdrawing a condensate stream 71 formed from the steam stream 41, and a third outlet for withdrawing a second contaminant-enriched raw water stream 66.

The purified water stream 42 comprises the condensate stream 71.

The system comprises a second heat exchanger 180 configured to provide indirect heat exchange between the reformate 60 and the raw water stream 53. The second heat exchanger 180 is operatively disposed to receive the reformate 60 from one of the first heat exchanger 190 as shown in FIGS. 1-4, and the first evaporator 51 as shown in FIGS. 5-8. The first evaporator 51 is operatively disposed to receive the at least a portion 63 of the raw water stream 53 from the second heat exchanger 180.

The system comprises a knock-out drum 220 operatively disposed to receive the reformate 60 from the second heat exchanger 180. The knock-out drum has a first outlet for withdrawing a water-depleted reformate 226 and a second outlet for withdrawing process condensate 224.

The system comprises a separator operatively disposed to receive the water-depleted reformate 226 from the knock-out drum 220. The separator produces the $H_2$-containing gas 200 from the water-depleted reformate 226. The separator may be a pressure swing adsorber.

The present invention also relates to a process for producing a $H_2$-containing gas 200 and for producing purified water 42 from a raw water stream 53 containing contaminants.

The process comprises withdrawing the reformate 60 from the reformer 100.

The process comprises heating at least a portion 63 of the raw water stream 53 by indirect heat transfer with the reformate 60 thereby cooling the reformate 60, and thereby evaporating a portion of the at least a portion 63 of the raw water stream 53 in the first evaporator 51 of the plurality of evaporators of the thermal water purification system 16. The evaporated portion forms a first steam stream 41. The remainder of the at least a portion 63 of the raw water stream 53 forms a first contaminant-enriched raw water stream 64. The first steam stream 41 and the first contaminant-enriched raw water stream 64 are withdrawn separately from the first evaporator 51. The first contaminant enriched raw water stream 64 is formed from the at least a portion 63 of the raw water stream 53. The first contaminant-enriched raw water stream 64 has a higher concentration of contaminants than the at least a portion 63 of the raw water stream 53 that was introduced into the first evaporator 51.

Heating of at least a portion 63 of the raw water stream 53 by indirect heat transfer with the reformate may be done with or without working fluid, where for example, the working fluid is water/steam.

As shown in FIGS. 1-4, the step of heating at least a portion 63 of raw water stream 53 by indirect heat transfer with the reformate may comprise heating a working fluid 185 by indirect heat transfer with the reformate 60 in heat exchanger 190, and heating the at least a portion 63 of raw water stream 53 by indirect heat transfer with the heated working fluid 196 in evaporator 51. The working fluid may be water and the heated working fluid may be steam.

The step of heating at least a portion 63 of raw water stream 53 by indirect heat transfer with the reformate may comprise heating working fluid water 185 by indirect heat transfer with the reformate 60 in heat exchanger 190 wherein the working fluid water is evaporated to form working fluid steam 196 having a pressure ranging from 15.2 kPa to 304 kPa (absolute) when heated by the reformate 60, and heating the at least a portion 63 of raw water stream 53 by indirect heat transfer with the working fluid steam 196 in evaporator 51. The working fluid steam is condensed when heating the at least a portion 63 of raw water stream 53 to reconstitute the working fluid water 185.

As shown in FIGS. 5-8, the step of heating at least a portion 63 of raw water 53 by indirect heat transfer with the reformate may be done without using an intermediate working fluid. As shown in FIGS. 5-8, the reformate may be passed to the first evaporator 51 to transfer heat to the at least a portion 63 of raw water stream 53 in evaporator 51. The reformate 60 may then be passed from first evaporator 51 to heat exchanger 90 or heat exchanger 180, depending on the selected sequence of heat exchange events.

The process comprises heating the raw water stream 53 in heat exchanger 180 by indirect heat transfer with the reformate 60 after the reformate has already been cooled in heat exchanger 190 or evaporator 51, thereby further cooling the reformate to a temperature ranging from 20° C. to 60° C. The at least a portion 63 of the raw water stream 53 is heated in heat exchanger 180 prior to being heated in the first evaporator 51. The at least a portion 63 of the raw water stream 53 is passed from the first heat exchanger 180 to the first evaporator 51. The at least a portion 63 of the raw water stream 53 comprises at least a portion of the raw water stream 53.

As shown in FIGS. 1, 3, 5, and 7, the raw water may be passed in series through each of the evaporators 51, 54, and 56. In the serial arrangement, at least a portion 63 of the raw water stream 53 is passed to the first evaporator 51 where water is evaporated from the raw water and a residual first contaminant-enriched raw water stream 64 is formed. The first contaminant-enriched raw water stream 64 is passed to the second evaporator 54 where more water is evaporated from the first contaminant-enriched raw water stream 64 to form a second contaminant-enriched raw water stream 66. The second contaminant-enriched raw water stream 66 is passed to a third evaporator 56 where more water is evaporated from the second contaminant-enriched raw water stream 66 to form low quality reject water 77. As stated before, any number of evaporators may be used.

As shown in FIGS. 2, 4, 6, and 8, the raw water may be passed through the evaporators 51, 54, and 56 in parallel. In the parallel arrangement, at least a portion 63 of the raw water stream 53 is passed to the first evaporator 51 where water is evaporated from the raw water and a residual first contaminant-enriched raw water stream 64 is formed. Another portion 65 of the raw water stream 53 is passed to the second evaporator 54 where water is evaporated from the raw water and a residual second contaminant-enriched raw water stream 66 is formed. Other portions of the raw water stream 53 are passed to any additional evaporators 56 in the system. Each of the residual contaminant-enriched raw water streams 64, 66 are collected to form the low quality reject water 77.

A mixed scheme of serial and parallel flow through the evaporators is also envisioned.

The process also comprises introducing the first steam stream 41 into the second evaporator 54 of the plurality of evaporators of the thermal water purification system 16 to heat raw water and evaporate water therein. When the raw water is introduced into the evaporators in series as shown in FIGS. 1, 3, 5, and 7, the first contaminant-enriched raw water stream 64 withdrawn from the first evaporator 51 is heated by indirect heat transfer with the first steam stream 41 to form a second steam stream 43 and a residual second contaminant-enriched raw water stream 66 by evaporating a portion of the first contaminant-enriched raw water stream 64. The second contaminant-enriched raw water stream 66 has a higher concentration of the contaminants than the first contaminant-enriched raw water stream 64 withdrawn from the first evaporator 51.

When the raw water is introduced into the evaporators in parallel as shown in FIGS. 2, 4, 6, and 8, the second portion 65 of the raw water stream 53 is heated by indirect heat transfer with the first steam stream 41 to form a second steam stream 43 and a residual second contaminant-enriched raw water stream 66 by evaporating a portion of the second portion 65 of the raw water stream 53. The second contaminant-enriched raw water stream 66 has a higher concentration of the contaminants than the second portion 65 of the raw water stream 53.

The first steam stream 41 is thereby cooled in the second evaporator 54 and forms a first condensate stream 71 from the first steam stream 41.

The second steam stream 43, the first condensate stream 71, and the second contaminant-enriched raw water stream 66 are each separately withdrawn from the second evaporator 54.

The purified water 42 comprises the first condensate stream 71.

The process further comprises forming the $H_2$-containing product gas 200 from the reformate 60 after cooling the reformate by indirect heat transfer with the raw water 53 in heat exchanger 180. The reformate, after cooling in heat exchanger 180, may be passed to knock-out drum 220 to remove water formed by condensation of steam, typically called process condensate thereby forming a condensate stream 224 and a water-depleted reformate 226. Process condensate 224 may be purified and reused, or alternatively discharged from the process. At least a portion of the water-depleted reformate 226 may then be introduced into a separator 210 and separated to produce the $H_2$-containing product gas 200 and a by-product gas 250. The reformate may be separated by any known means for separating reformate. As shown in the figures, the reformate 60 may be separated by pressure swing adsorption in pressure swing adsorber 210 to produce the $H_2$-containing product 200 and the by-product gas 250. The by-product gas 250 from a pressure swing adsorber is commonly called a tail gas. Alternatively, the reformate 60 may be cryogenically separated into synthesis gas products in a cold box (not shown).

The temperature of the reformate introduced into the knock-out drum 220 may be controlled by the flow rate of the raw water 53 passed through heat exchanger 180. Excess raw water not passed to any evaporator of the thermal water purification system 16 may be rejected as slip stream 67.

A portion or all of the purified water may be used as make-up water (reactant feedstock) for the reforming process. Heat from the reformate may be transferred to the make-up water for the reforming process.

"Make-up water" is water introduced into the catalytic steam-hydrocarbon reforming process as a feedstock stream. Make-up water can be boiler feed water quality or may need to be further treated to become boiler feed water quality. The amount of make-up water added to the system is the amount required for reaction in the catalytic steam-hydrocarbon reforming process plus the amount required for export steam production. In case excess steam in the reformate, which is condensed in knock-out drum 220 as process condensate 224, is not recycled to the process, the amount of make-up water required is increased by the amount of process condensate.

The make-up water 95 may comprise purified water 42. The make-up water 95 may consist of purified water 42. A portion or all of the purified water 42 produced may be used as make-up water for the reforming process. The make-up water 95 may additionally comprise a portion or all of the process condensate 224 obtained from knock-out drum 220.

The process may comprise heating a first water stream 95 (i.e. make-up water) by indirect heat transfer with the reformate 60 in heat exchanger 90 thereby cooling the reformate 60. As shown in FIGS. 1, 2, 5, and 6, the reformate 60 may heat the first water stream 95 in heat exchanger 90 before heating the at least a portion 63 of the raw water stream 53 in evaporator 51 or via heat exchanger 190. As shown in FIGS. 3, 4, 7, and 8, the reformate 60 may heat the at least a portion 63 of the raw water stream 53 in evaporator 51 or via heat exchanger 190 before heating the first water stream 95 in heat exchanger 90. In either case, the reformate 60 heats the first water stream 95 in heat exchanger 90 and the at least a portion 63 of the raw water stream 53 in evaporator 51 or via heat exchanger 190 before the reformate 60 is further cooled in heat exchanger 180.

The process may comprise passing the first water stream 95 (i.e. make-up water) to a deaerator 130 to remove dissolved gases after heating the first water stream by indirect heat transfer with the reformate 60. In the figures, make-up water 95 is passed to deaerator 130, where steam is also introduced and a vent stream 17 and deaerated water 123 are withdrawn. The deaerated water 123 can then be heated in heat exchanger 170 and fed as boiler feed water 105 to steam drum 160, as previously discussed.

In practice, the purified water from the thermal water purification process might not contain dissolved gases, and can therefore be heated in heat exchangers 90 and 170 and fed to steam drum 160 without being treated in deaerator 130. Direct use of the purified water will save on water treatment costs at the $H_2$-producing reforming plant. Use of purified water 42 as boiler feed water can pay for itself if the total cost of the purified water is less than the sum of the raw water cost plus the capital and operating cost of water treatment and deaeration at the $H_2$-producing reforming plant.

In case the purified water 42 contains an unacceptable level of minerals, the purified water 42 may be treated by at least one of an ion exchange unit (ie. by condensate polishing or mixed bed polishing) and an electrodeionization unit. Removal of trace dissolved minerals and suspended matter by ion exchange (condensate polishing) is well-known and commercial units are available from Siemens, for example. Removal of minerals by electrodeionization (EDI) is also well-known and commercial units are available from General Electric, for example.

The present process rejects waste heat from the reforming process through the MED process. The waste heat from the reforming process is transferred to the MED process via the first evaporator 51 and heat exchanger 180. This heat is eventually rejected to the environment through cooling by raw water 53 in condenser 134 and through the low quality reject water 77 discharged. If the low quality reject water 77 flow is small due to high water recovery, a portion of the waste heat from the reforming process transferred via heat exchanger 180 is rejected to the environment by slip stream 67. Water recovery is defined as the amount of total distillate or product water (i.e. flow rate of stream 42) divided by the amount of feed water (i.e. flow rate of stream 53).

There are two major benefits of the present process and system. First it converts the waste heat of the reforming process into a low cost heat source for the MED process. In case a intermediate working fluid steam is used as in FIGS. 1-4, the cost of the heat source is the cost of the heat exchanger (boiler) 190, which will be small in comparison with the low pressure steam produced in a stand-alone MED process from a primary energy source with dedicated equipment (e.g. a natural gas-fired package boiler). Second, by rejecting the waste heat from the reforming process through the MED process, the present process and system eliminate the cost associated with waste heat rejection in the reforming process without adding significant cost to the MED process. As described above, all heat rejection is carried out through the existing equipment in the MED process, except heat exchanger 180. However, heat exchanger 180 replaces the flash boxes and preheaters in the original MED process for feed water preheating. After the trade-off, the net cost of heat exchanger 180 may be minimal, or even provide a net cost savings.

The benefits and advantages are illustrated further by the examples presented below.

Example 1

Comparative Case

In example 1, the reforming system and process are not integrated with the multiple effect distillation system and process. The back end of the reforming process for example 1 is shown in FIG. 9.

The reformate 360 has a molar flow rate of 4.6 kmol/s. The reformate 360 is introduced into heat exchanger 390 at a temperature of 141.8° C. and leaves heat exchanger 390 at a temperature of 117.4° C. The reformate has a molar composition of 52.8% $H_2$, 27.3% $H_2O(g)$, 11.4% $CO_2$, 5.5% $CH_4$, 2.8% CO and 0.3% $N_2$. The reformate 360 heats the deaerator feed water 395 in heat exchanger 390. The deaerator feed water has a flow rate of 2.58 kmol/s where 1.34 kmol/s is make-up water and 1.24 kmol/s is process condensate 324. The deaerator feed water 395 enters heat exchanger 390 at a temperature of 26.5° C. and leaves heat exchanger 390 at a temperature of 97.2° C.

The reformate 360 is further cooled in heat exchanger 380 from 97.2° C. to the required temperature of 37.8° C. for the hydrogen separation unit 310 using cooling water 385. The inlet and outlet temperature of the cooling water 385 are 29.4° C. and 37.8° C., respectively, corresponding with the operating conditions of a cooling tower.

The heat duty for heat exchanger 390 is 13.7 MW and the heat duty for heat exchanger 380 is 23.5 MW. The product, UA, of the heat transfer coefficient, U, and the area, A, is 208,437 J/K-s for heat exchanger 390 and 648,956 J/K-s for heat exchanger 380. The cost of a heat exchanger is conventionally related to its UA.

The stand-alone multiple effect distillation process is used to produce the make-up water for the reforming process. In this example, 7 evaporators 420 are used. To produce 1.34 kmol/s of make-up water, the process needs 8 MW of energy using steam 410 and rejects about 8 MW of heat to the cooling water in condenser 434.

The stand-alone multiple effect distillation process produces the make-up water at about 15.6° C.

The water recovery of the MED process is 32%, where the water recovery is the total water produced by the MED process divided by the raw water introduced to the MED process.

Example 2

Figure 5:
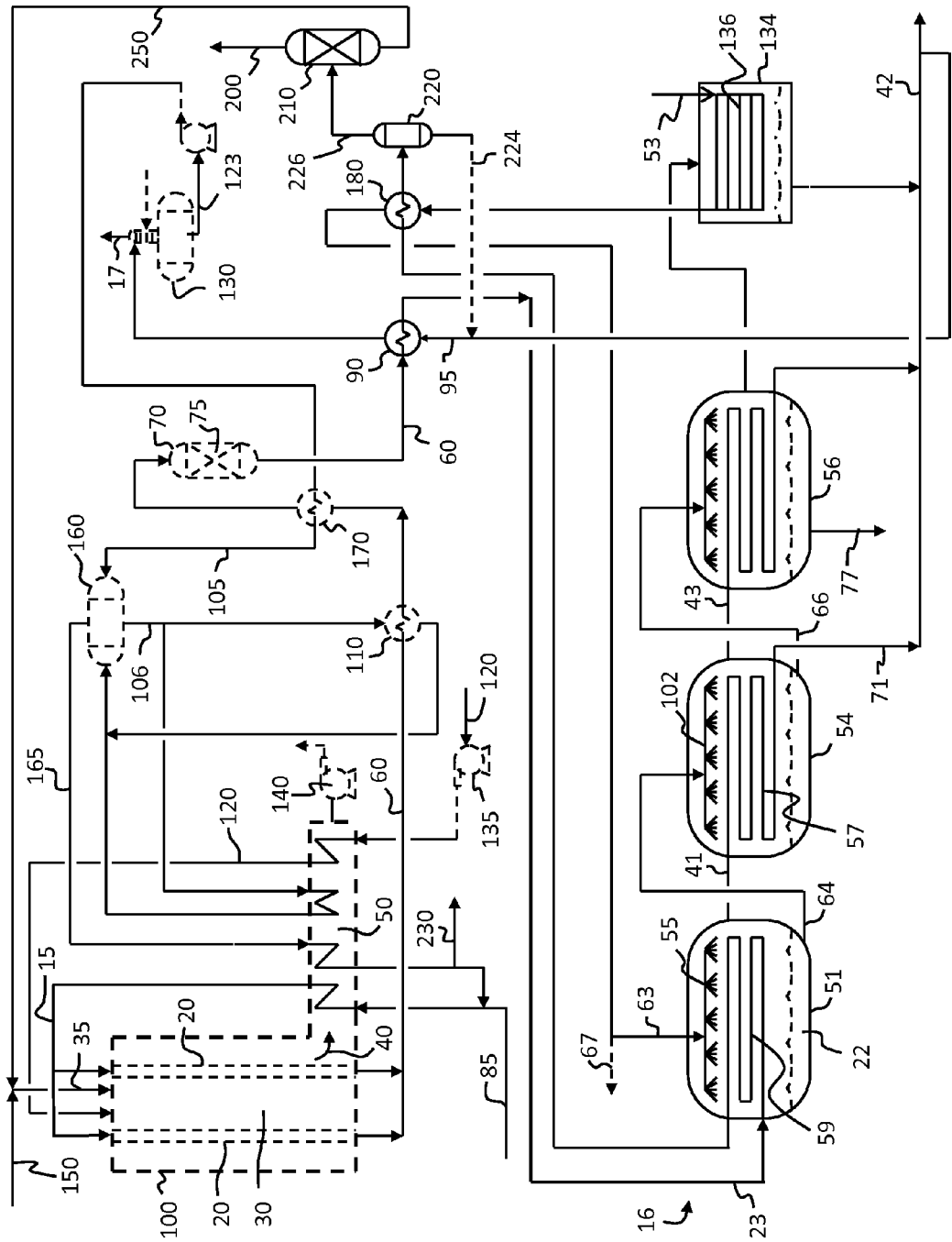
FIG. 5 is process flow diagram of a reforming process integrated with a multiple effect distillation process not utilizing a working fluid to exchange heat from the reformate to an evaporator of the multiple effect distillation process where raw water is introduced into the evaporators in a serial manner.
Figure 6:
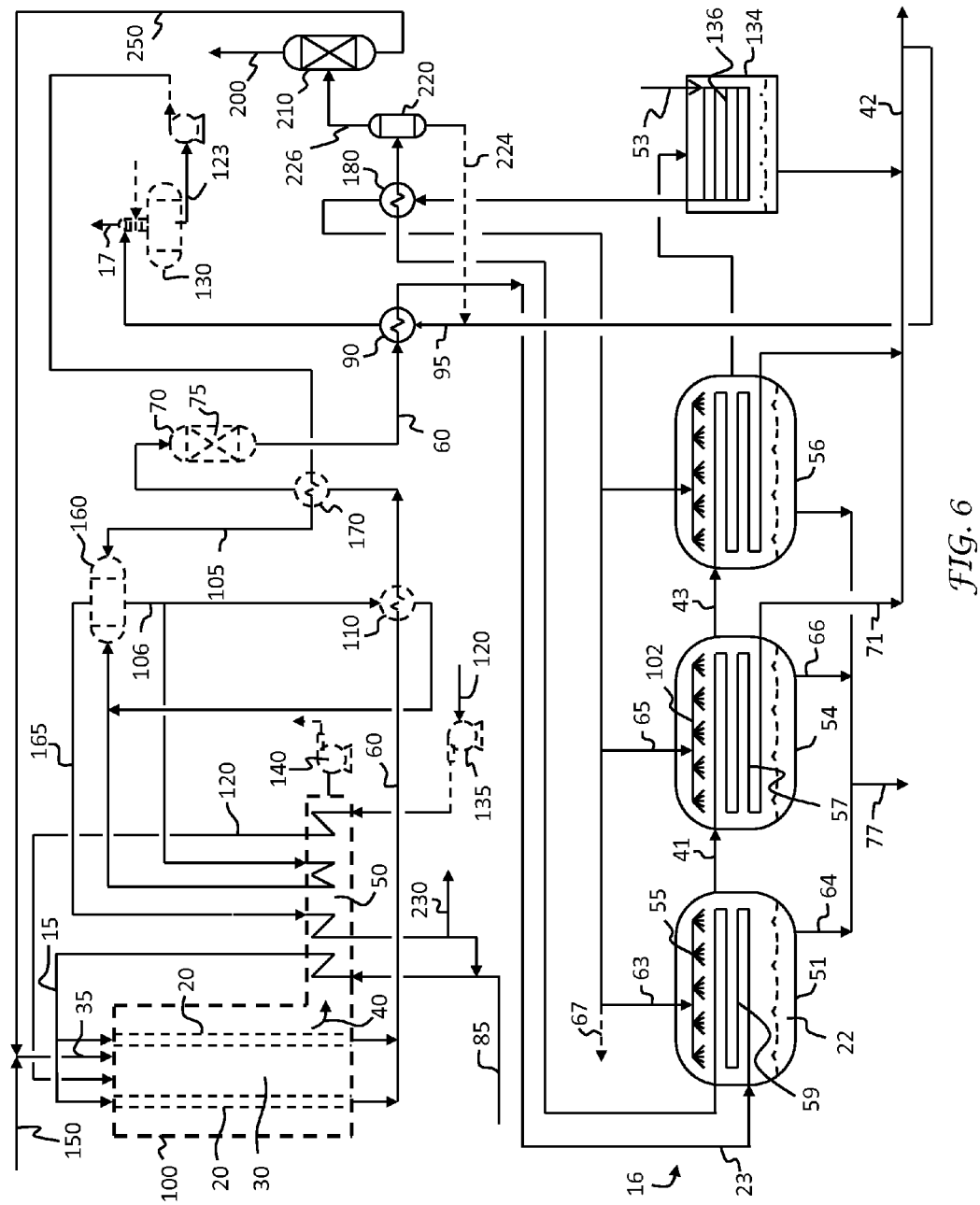
FIG. 6 is process flow diagram of a reforming process integrated with a multiple effect distillation process not utilizing a working fluid to exchange heat from the reformate to an evaporator of the multiple effect distillation process where raw water is introduced into the evaporators in a parallel manner.
Figure 7:
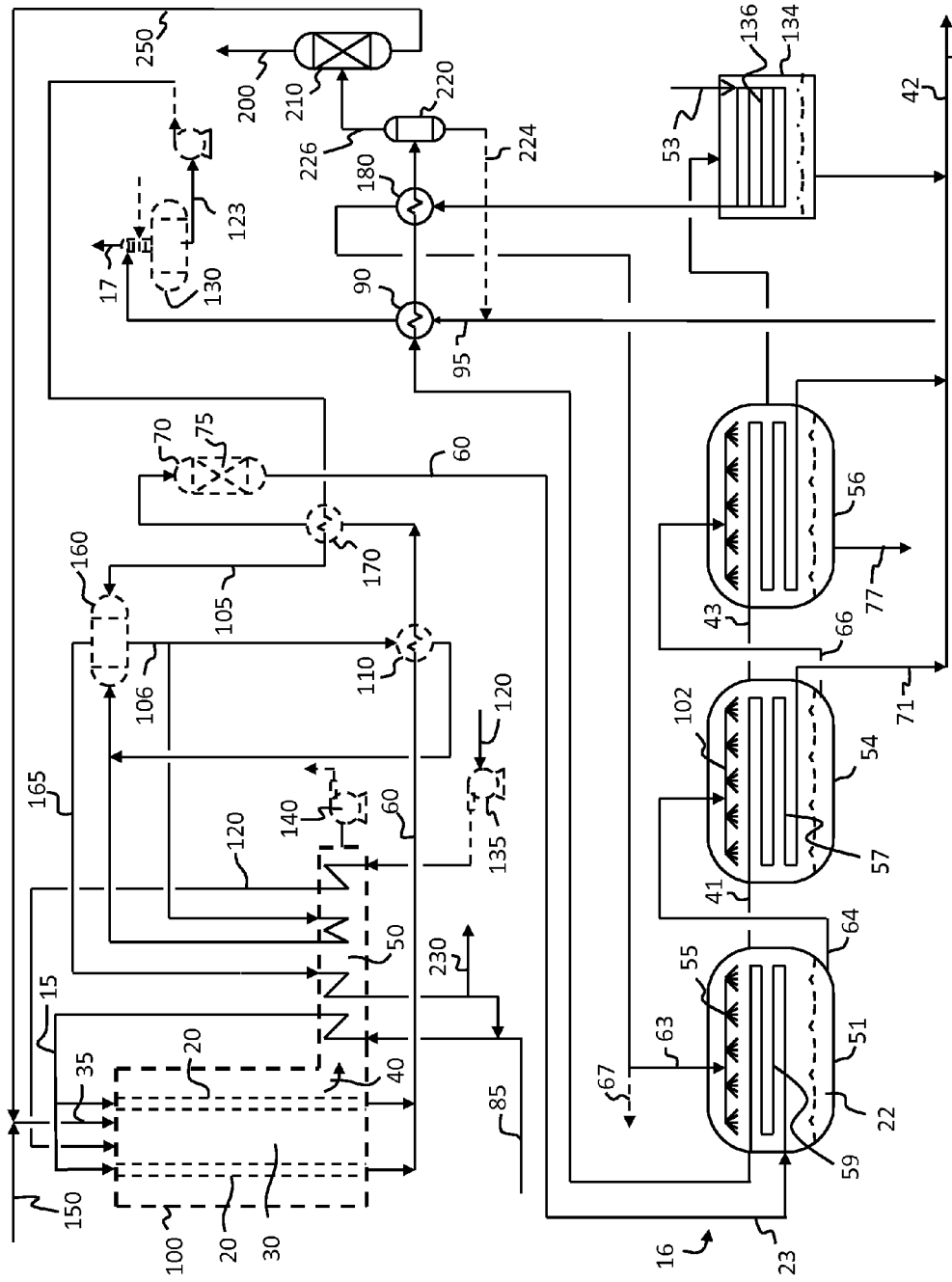
FIG. 7 is another process flow diagram of a reforming process integrated with a multiple effect distillation process not utilizing a working fluid to exchange heat from the reformate to an evaporator of the multiple effect distillation process where raw water is introduced into the evaporators in a serial manner.
Figure 8:
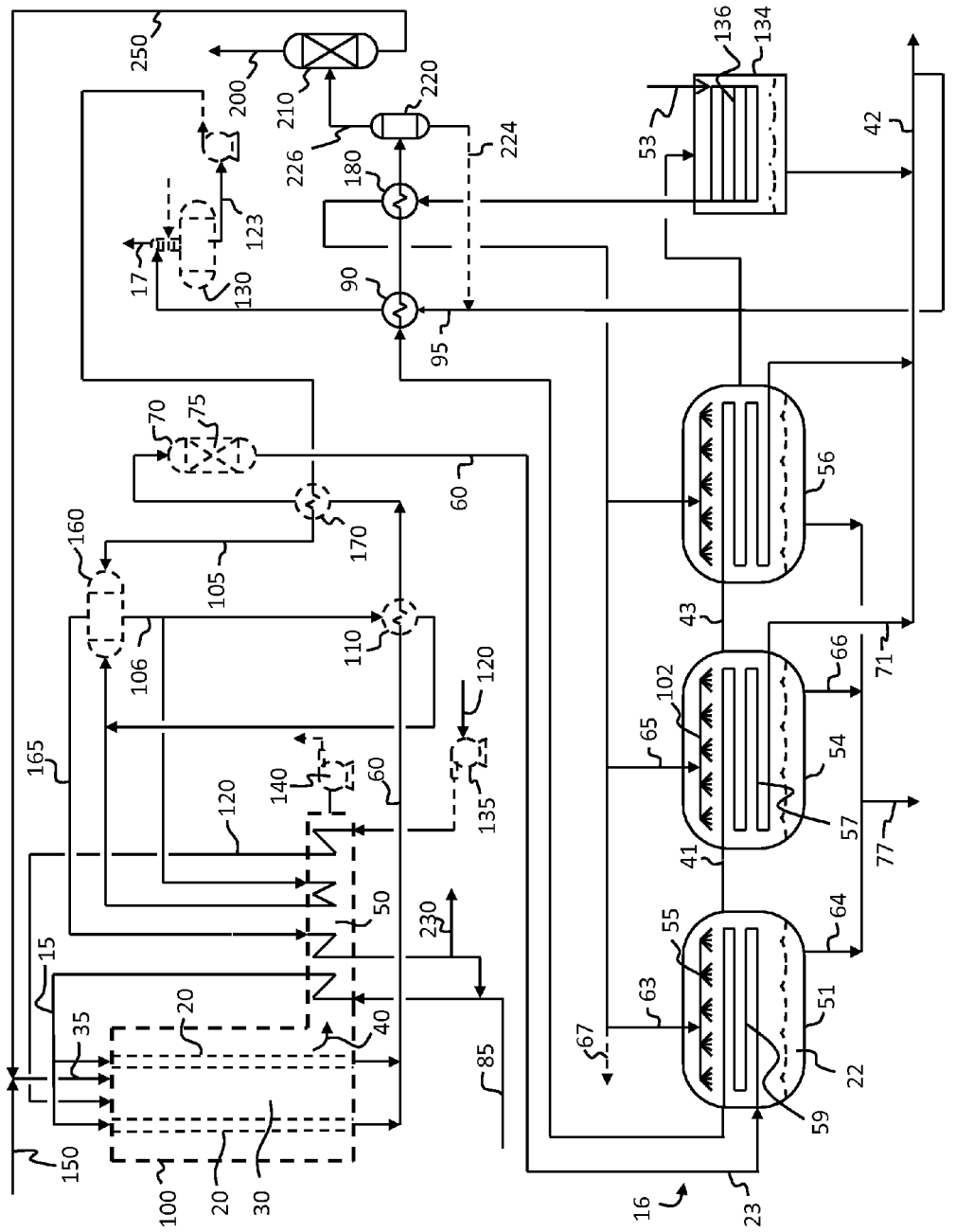
FIG. 8 is another process flow diagram of a reforming process integrated with a multiple effect distillation process not utilizing a working fluid to exchange heat from the reformate to an evaporator of the multiple effect distillation process where raw water is introduced into the evaporators in a parallel manner.

In example 2, the reforming process and the multiple effect distillation process are integrated as shown in FIG. 5. The multiple effect distillation process also uses 7 evaporators as in example 1.

The reformate 60 has a molar flow rate of 4.6 kmol/s. The reformate 60 is introduced into heat exchanger 90 at a temperature of 141.8° C. and leaves heat exchanger 90 at a temperature of 129.9° C. The reformate has a molar composition of 52.8% $H_2$, 27.3% $H_2O(g)$, 11.4% $CO_2$, 5.5% $CH_4$, 2.8% CO and 0.3% $N_2$. The reformate 60 heats the deaerator feed water 95 in heat exchanger 90. The deaerator feed water has a flow rate of 2.58 kmol/s where 1.34 kmol/s is make-up water and 1.24 kmol/s is process condensate 224. The deaerator feed water 95 enters heat exchanger 90 at a temperature of 59.1° C. and leaves heat exchanger 90 at a temperature of 97.2° C.

After heating the deaerator feed water 95 in heat exchanger 90, the reformate 60 is introduced into the first evaporator 51 at a temperature of 129.9° C. to evaporate water. The reformate 60 is withdrawn from the first evaporator 51 at a temperature of 112.8° C. Raw water 63 is introduced into evaporator 51 at a molar flow rate of 4.2 kmol/s. The raw water is introduced into evaporator 51 at a temperature of 83.9° C. and withdrawn at a temperature of 100.8° C.

The reformate withdrawn from the first evaporator is subsequently introduced into heat exchanger 180 to heat the feed water that is introduced into the first evaporator 51 of the multiple effect distillation process. The reformate is cooled in heat exchanger 180 from 112.8° C. to the required temperature of 37.8° C. for the hydrogen separation unit 210. The raw water 53 is heated in heat exchanger 180 from 15.6° C. to 83.9° C.

The heat duty for heat exchanger 90 is 7.4 MW, the heat duty for the first evaporator 51 is 8.4 MW, and the heat duty for heat exchanger 180 is 21.5 MW. The product, UA, of the heat transfer coefficient, U, and the area, A, is 130,086 J/K-s for heat exchanger 90, 320,924 J/K-s for the first evaporator 51, and 725,936 J/K-s for heat exchanger 180.

The inlet temperature of the deaerator feed water to heat exchanger 90 (59.1° C.) is greater than that to heat exchanger 390 (26.5° C.) in example 1 because the make-up water from the integrated MED process is at a higher temperature (78.4° C.) than the make-up water from the stand-alone MED process. Part of the make-up water preheating in Example 2 is carried out in the MED process by the reformate transferring heat to the make-up water in the first evaporator 51 and the heat exchanger 180.

The water recovery in example 2 is 32%.

There is no consumption of supplementary cooling water in example 2 compared to example 1.

While the configuration in example 1 includes flash-box preheaters 440, example 2 requires no flash-box preheaters, since the feed water to the first evaporator is heated in heat exchanger 180 using the reformate 60.

A benefit of the present invention can be illustrated by comparing the equipment and operating cost for cooling the reformate from the incoming temperature of 141.8° C. to the required temperature of 37.8° C. for the $H_2$ separation unit 210, and the cost for producing the make-up water by the MED process. In the stand-alone case of example 1, heat exchangers 390 and 380 are used to cool the reformate 360. The equipment cost associated with this cooling can be indicated by the total UA of heat exchangers 380 and 390, which is 857,393 J/K-s. The operating cost can be indicated by the cooling water duty of 23.5 MW. On the MED side, the equipment cost will be that of a conventional 7 evaporator MED process. The MED process needs a heat source of about 8 MW to produce 1.34 kmol/s make-up water and cooling water to reject about 8 MW heat via condenser 434.

For the case of the present invention as illustrated in example 2, all of the heat in the reformate is transferred to the deaerator feed water and the MED process through heat exchangers 90 and 180, and the first evaporator 51. Since the first evaporator 51 is designed with a similar duty to that in example 1 and becomes part of the cost of the MED, it does not add any equipment cost for reformate cooling. The equipment cost for reformate cooling in example 2, therefore, can be indicated by the total UA of heat exchangers 90 and 180, which is 856,022 J/K-s, which is similar to the total UA in example 1.

There is no heat rejection on the reforming process side in example 2. The cooling water duty for condenser 134 in the MED process is 12.5 MW, which is much smaller than the combined cooling water duty in example 1 (23.5+8=31.5 MW). This smaller cooling water duty is due to the fact that the process in example 2 does not use a dedicated heat source, and therefore, does not need to reject the 8 MW heat from the heat source, and that 11 MW of the heat in the reformate is rejected to the environment when the low quality reject water leaves the MED process at 67.2° C. In summary, for cooling the reformate from the incoming temperature to the final required temperature, the equipment cost in example 2 is similar to example 1 and the operating cost associated with cooling water in example 2 is 40% of that in example 1.

The cost for producing the make-up water by the integrated MED process is also much less than that in Example 1 mainly because 1) the integrated process does not need the 8 MW heat source, and 2) it saves on the cost associated with the flash-box preheater arrangement. Other costs of the MED process are assumed to be similar in the two examples.

We claim:

1. A process for producing a $H_2$-containing product gas and for producing purified water from a raw water stream containing contaminants, the process comprising:
 (a) withdrawing a reformate from a reformer;
 (b) heating at least a portion of the raw water stream by indirect heat transfer with the reformate thereby cooling the reformate, and thereby evaporating a portion of the at least a portion of the raw water stream in a first evaporator of a plurality of evaporators of a thermal water purification system to form a first steam stream and a first contaminant-enriched raw water stream, withdrawing the first steam stream from the first evaporator, and withdrawing the first contaminant-enriched raw water stream from the first evaporator, the first contaminant-enriched raw water stream having a higher concentration of the contaminants than the at least a portion of the raw water stream introduced into the first evaporator;
 (c) heating the raw water stream by indirect heat transfer with the reformate after the reformate has already been cooled in step (b), thereby further cooling the reformate to a temperature ranging 20° C. to 60° C., wherein the at least a portion of the raw water stream is heated in step (c) prior to being heated in step (b);
 (d) introducing the first steam stream into a second evaporator of the plurality of evaporators of the thermal water purification system, heating one of either the first contaminant-enriched raw water stream withdrawn from the first evaporator or a second portion of the raw water stream by indirect heat transfer with the first steam stream to form a second steam stream by evaporating a portion of either the one of the first contaminant-enriched raw water stream or the second portion of the raw water stream, thereby cooling the first steam stream and forming a first condensate stream from the first steam stream, withdrawing the second steam stream from the second evaporator, withdrawing the first condensate stream from the second evaporator wherein the purified water comprises the first condensate stream, and withdrawing a second contaminant-enriched raw water stream from the second evaporator, the second contaminant-enriched raw water stream having a higher concentration of the contaminants than the one of either the first contaminant-enriched raw water stream withdrawn from the first evaporator or the second portion of the raw water stream; and
 e) forming the $H_2$-containing product gas from the reformate after cooling the reformate in step (c).

2. The process of claim 1 wherein heating at least a portion of a raw water stream by indirect heat transfer with the reformate in step (b) comprises:
 heating a working fluid by indirect heat transfer with the reformate to form a heated working fluid, and
 heating the at least a portion of the raw water stream by indirect heat transfer with the heated working fluid in the evaporator.

3. The process of claim 1 wherein heating the at least a portion of the raw water stream by indirect heat transfer with the reformate in step (b) comprises:
 heating working fluid water by indirect heat transfer with the reformate wherein the working fluid water is evaporated to form working fluid steam having a pressure ranging from 15.2 kPa to 304 kPa (absolute) when heated by the reformate, and
 heating the at least a portion of the raw water stream by indirect heat transfer with the working fluid steam in the evaporator, wherein the working fluid steam is condensed when heating the at least a portion of the raw water stream.

4. The process of claim 1 wherein step (b) does not include heating of an intermediate working fluid.

5. The process of claim 1 further comprising:
 (f) heating a first water stream by indirect heat transfer with the reformate thereby cooling the reformate, wherein the first water stream comprises at least a portion of the purified water;
 wherein the reformate is cooled in step (f) prior to being cooled in step (b), or the reformate is cooled in step (b) prior to being cooled in step (f).

6. The process of claim 5 further comprising passing the first water stream to a deaerator after heating the first water stream in step (f).

7. The process of claim 5 further comprising:
passing the first water stream to a steam drum after heating the first water stream in step (f) without passing the first water stream to a deaerator.

8. The process of claim 5 further comprising:
passing the first water stream to at least one of an ion exchange unit and electrodeionization unit before heating the first water stream in step (f); and
passing the first water stream to a steam drum after heating the first water stream in step (f) without passing the first water stream to a deaerator.

9. The process of claim 1 wherein the step of forming the $H_2$-containing product gas from the reformate comprises:
passing the reformate after cooling in step (c) to a knock-out drum, separating the reformate into a condensate stream and a water-depleted reformate; and
introducing at least a portion of the water-depleted reformate into a separator and separating the at least a portion of the water-depleted reformate in the separator to produce the $H_2$-containing product gas and a by-product gas.

10. The process of claim 9 wherein the separator is a pressure swing adsorber.

11. The process of claim 1, wherein the raw water comprises at least one of salt water, river water, stream water, lake water, municipal recycled water, industrial recycled water, groundwater, and process condensate from a steam methane reforming process.

12. A system for producing a $H_2$-containing gas and for producing purified water from a raw water stream containing contaminants, the system comprising:
a reformer having an outlet for withdrawing a reformate;
a thermal water purification system comprising a plurality of evaporators, the plurality of evaporators comprising:
a first evaporator configured to provide indirect heat exchange between at least a portion of the raw water stream and one of either the reformate or steam where the steam is formed from water by indirect heat exchange with the reformate in a first heat exchanger, the first evaporator operatively disposed to receive the one of either the reformate from the reformer or steam from the first heat exchanger, the first evaporator operatively disposed to receive the at least a portion of the raw water stream, the first evaporator having a first outlet for withdrawing a steam stream formed from the at least a portion of the raw water stream and a second outlet for withdrawing a contaminant-enriched raw water stream formed from the at least a portion of the raw water stream, and
a second evaporator configured to provide indirect heat exchange between the steam stream and one of either the contaminant-enriched raw water stream or a second portion of the raw water stream, the second evaporator operatively disposed to receive the one of either the contaminant-enriched raw water stream or the second portion of the raw water stream, the second evaporator operatively disposed to receive the steam stream from the first evaporator, the second evaporator having a first outlet for withdrawing a steam stream formed from the one of either the contaminant-enriched raw water or the second portion of the raw water stream, a second outlet for withdrawing a condensate stream formed from the steam stream, and a third outlet for withdrawing a second contaminant-enriched raw water stream formed from the one of either the containment-enriched raw water stream or the second portion of the raw water stream, wherein the purified water stream comprises the condensate stream;
a second heat exchanger configured to provide indirect heat exchange between the reformate and the raw water stream, the second heat exchanger operatively disposed to receive the reformate from one of the first evaporator and the first heat exchanger, wherein the first evaporator is operatively disposed to receive the at least a portion of the raw water stream from the second heat exchanger;
a knock-out drum operatively disposed to receive the reformate from the second heat exchanger, the knock-out drum having a first outlet for withdrawing a water-depleted reformate and a second outlet for withdrawing water; and
a separator operatively disposed to receive the water-depleted reformate from the knock-out drum, the separator for producing the $H_2$-containing gas from the water-depleted reformate.

13. The system of claim 12 wherein the first evaporator is configured to provide indirect heat exchange between the at least a portion of the raw water stream and the reformate, wherein the first evaporator is operatively disposed to receive the reformate from the reformer, and wherein the second heat exchanger is operatively disposed to receive the reformate from the first evaporator.

14. The system of claim 12 wherein the first evaporator is configured to provide indirect heat exchange between the at least a portion of the raw water stream and steam where the steam is formed from water by indirect heat exchange with the reformate in the first heat exchanger, the first evaporator is operatively disposed to receive the steam from the first heat exchanger, and wherein the second heat exchanger is operatively disposed to receive the reformate from the first heat exchanger.

15. The system of claim 12 wherein the separator is a pressure swing adsorber.

16. The system of claim 12 wherein the reformer is a catalytic steam-hydrocarbon reformer.

* * * * *